US007220954B2

(12) United States Patent
Kuzmich et al.

(10) Patent No.: US 7,220,954 B2
(45) Date of Patent: May 22, 2007

(54) QUANTUM STATE TRANSFER BETWEEN MATTER AND LIGHT

(75) Inventors: Alexander M. Kuzmich, Atlanta, GA (US); Dzmitry N. Matsukevich, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 13 days.

(21) Appl. No.: 11/286,020

(22) Filed: Nov. 23, 2005

(65) Prior Publication Data

US 2006/0163465 A1 Jul. 27, 2006

Related U.S. Application Data

(60) Provisional application No. 60/647,679, filed on Jan. 27, 2005.

(51) Int. Cl.
*G02F 1/01* (2006.01)

(52) U.S. Cl. ...................... 250/214.1; 250/225; 257/14

(58) Field of Classification Search ............ 250/214.1, 250/216, 225; 257/14, 183; 398/158
See application file for complete search history.

(56) References Cited

U.S. PATENT DOCUMENTS

2004/0264958 A1* 12/2004 Zoller et al. .................. 398/40

* cited by examiner

*Primary Examiner*—Kevin Pyo
(74) *Attorney, Agent, or Firm*—Kenneth W. Float

(57) ABSTRACT

Disclosed are apparatus and methods that provide for a coherent quantum state transfer of information from a two-level atomic system (matter) to a single photon (light). Entanglement between a single photon (signal) and a two-component atomic ensemble of cold Rubidium atoms is used to project a quantum memory element (the atomic ensemble) onto any desired state by measuring the signal in a suitable basis. The atomic qubit is read out by stimulating directional emission of a single photon (idler) from the (entangled) collective state of the ensemble. Faithful atomic memory preparation and readout are verified by observed correlations between the signal and idler photons. These results are an important component of distributed quantum networking.

5 Claims, 5 Drawing Sheets

QUANTUM STATE TRANSFER BETWEEN MATTER AND LIGHT

This application claims the benefit of U.S. Provisional Application No. 60/647,679, filed Jan. 27, 2005.

BACKGROUND

The present invention relates to the quantum state transfer of information between matter and light.

The ability to coherently transfer quantum information between photonic- and material-based quantum systems is a prerequisite for all practical distributed quantum computation and scalable quantum communication protocols. The importance of this process is rooted in the fact that matter-based quantum systems provide excellent long-term quantum memory storage, whereas long-distance communication of quantum information will most certainly be accomplished by coherent propagation of light, often in the form of single photon pulses.

In the microwave domain, coherent quantum control has been obtained with single Rydberg atoms and single photons, and advances have also been made in ion trapping information processing. Particularly, an entangled state of an ion and a photon has been produced. However, to convert a single ion (atom) qubit state into a photonic state, strong coupling to a single cavity mode is required. Trapped atoms or ions localized inside high-finesse cavities offer a natural paradigm for coherent, reversible matter-light interactions, although technical challenges make these systems difficult to realize in practice.

Optically thick atomic ensembles have emerged recently as an alternative for the light-matter interface. Duan, Lukin, Cirac, and Zoller (DLCZ) have made a theoretical proposal aimed at long-distance quantum communication that uses the quantum memory capability of atomic ensembles. Important initial steps toward realization of the DLCZ protocol have been made in which nonclassical radiation has been produced from an atomic ensemble, thereby demonstrating the collective enhancement.

It would be desirable to have systems and methods that provide for the quantum state transfer of information between matter and light.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 5*b* illustrates measured conditional probabilities at points of highest correlation in FIG. 5*a.

DETAILED DESCRIPTION

Disclosed herein are apparatus 10 and methods 40 that provide for a quantum state transfer of information between matter and light. In particular, the apparatus 10 and methods 40 provide for a coherent quantum state transfer from a matter qubit (quantum bit) onto a photonic qubit, using an optically thick cold atomic cloud 15.

Figure 1:
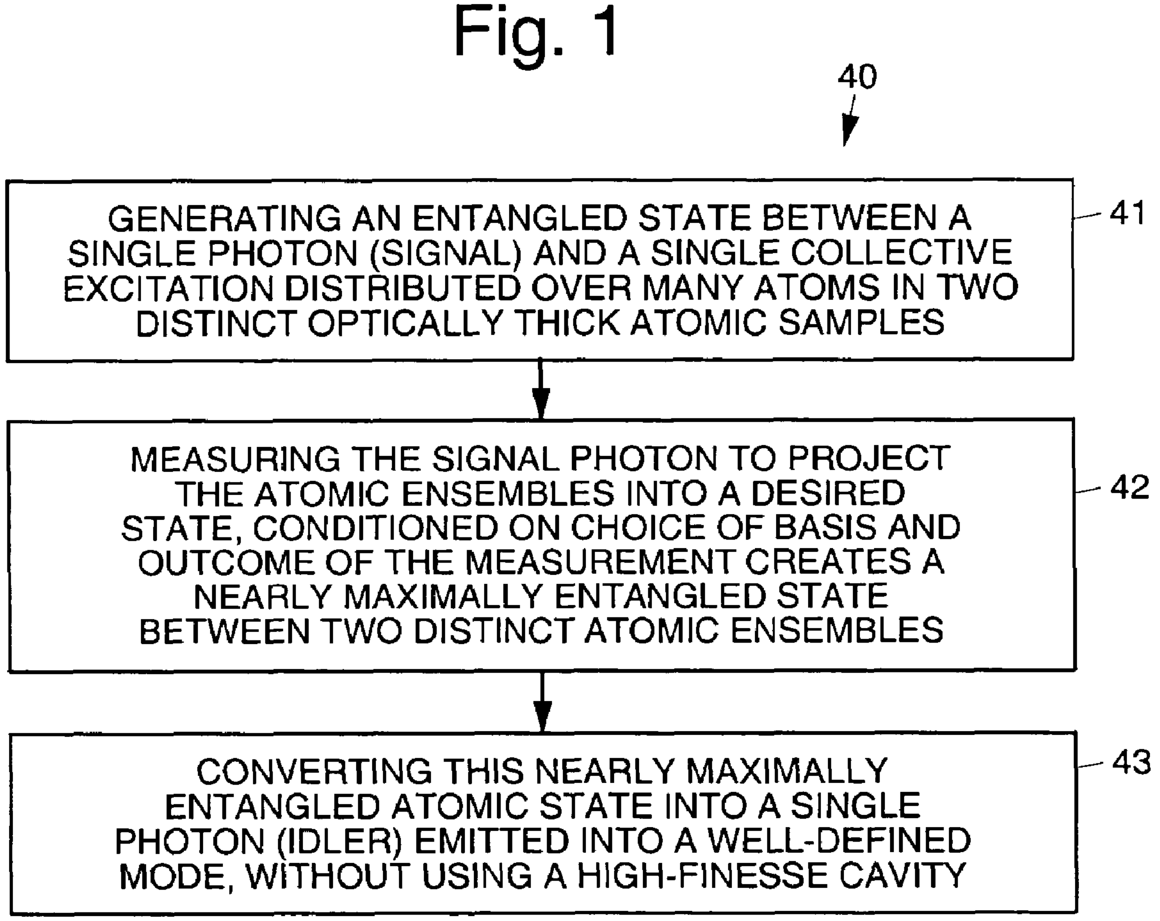
FIG. 1 is a flow diagram that illustrates an exemplary quantum state transfer method.

Referring to the drawing figures, FIG. 1 is a flow diagram that illustrates an exemplary quantum state transfer method. In general, implementing the apparatus 10 and methods 40 involves three basic activities. (i) An entangled state between a single photon (signal) and a single collective excitation distributed over many atoms in two distinct optically thick atomic samples (atomic ensembles) is generated 41. (ii) Measurement 42 of the signal photon projects the atomic ensembles into a desired state, conditioned on the choice of basis and the outcome of the measurement. (iii) This atomic state is converted 43 into a single photon (idler) emitted into a well-defined mode, without using a high-finesse cavity.

Figure 2A:
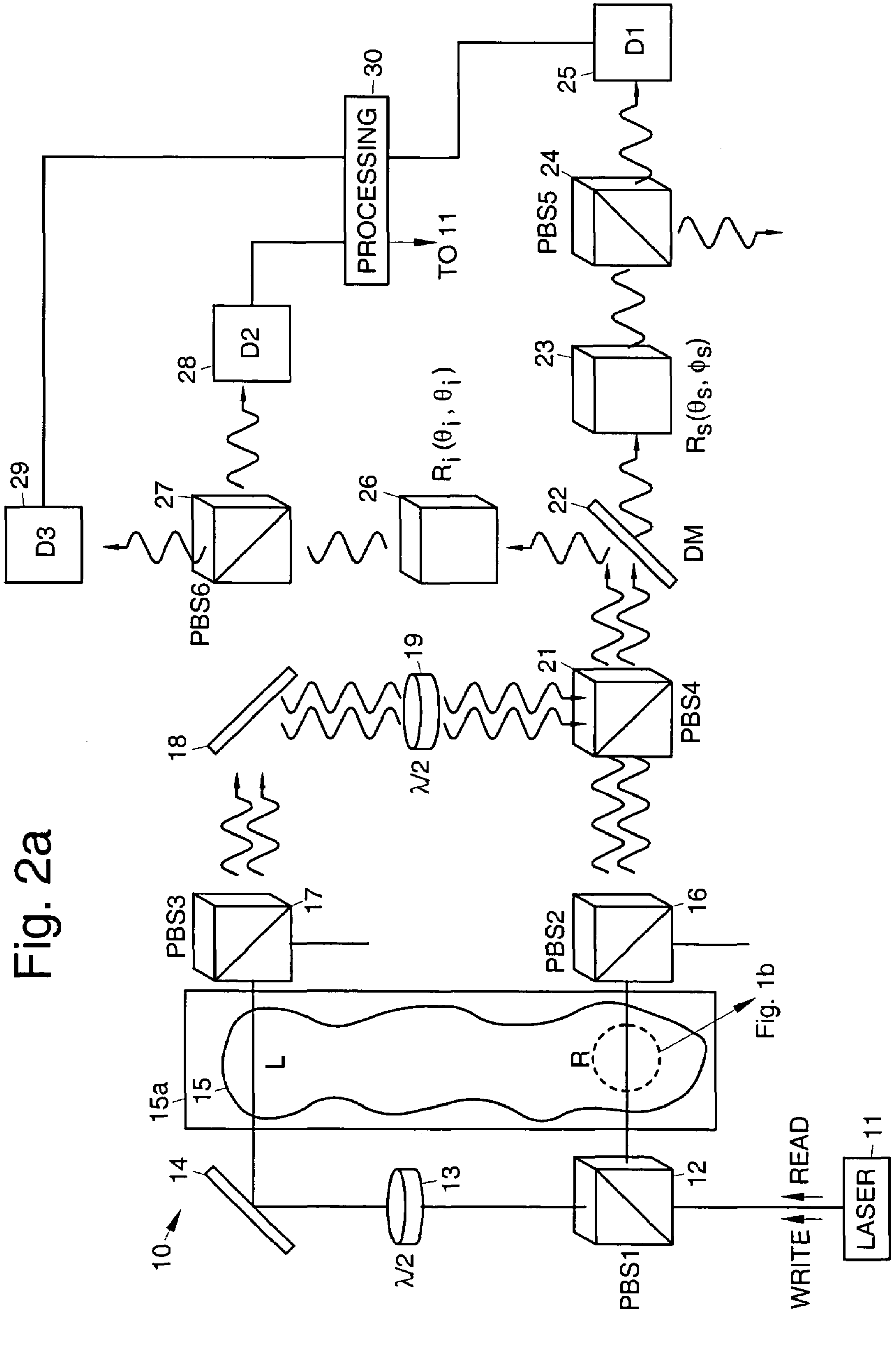
FIG. 2*a* illustrates exemplary apparatus and methods for providing a quantum state transfer of information between matter and light.
Figure 2B:
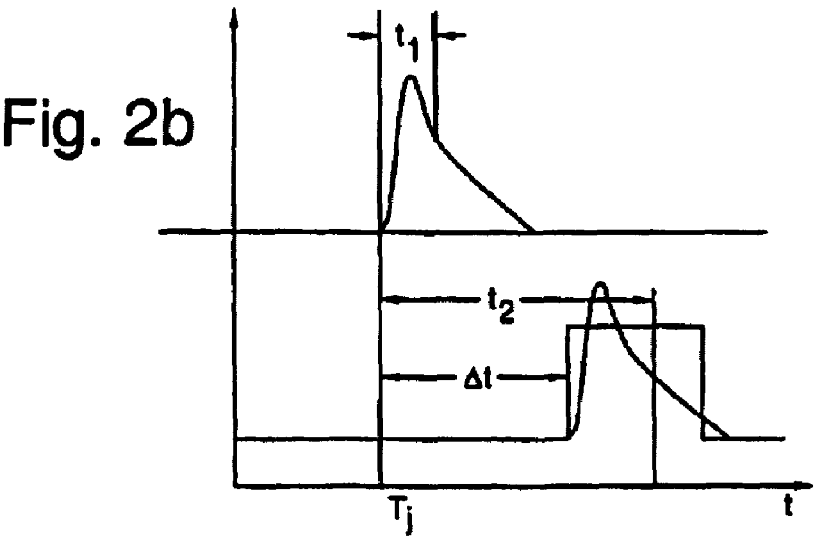
FIG. 2*b* illustrates timing relating to write and read laser pulses.
Figure 3:
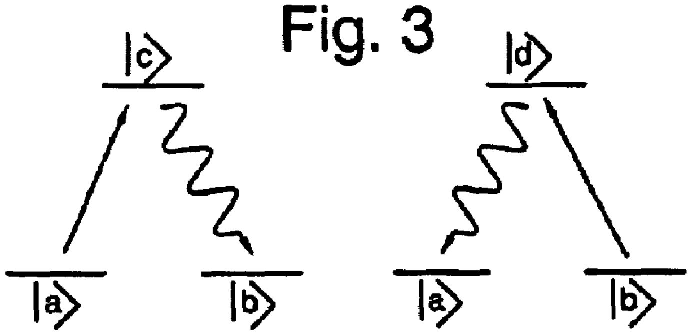
FIG. 3 illustrates the relevant atomic level structure.

FIG. 2*a* illustrates details of exemplary apparatus 10 and methods 40 for providing a quantum state transfer of information between matter and light. FIG. 2*b* illustrates timing relating to write and read laser pulses within the dashed circle shown in FIG. 2*a*. FIG. 3 schematically indicates the structure of four atomic levels of quantum state transitions that occur within the apparatus 10: $|a\rangle$, $|b\rangle$, $|c\rangle$, and $|d\rangle$.

As illustrated in FIG. 2*a,* a laser 11 is used to generate classical laser pulses used in generating and verifying procedures that define two distinct pencil-shape components of the atomic ensemble that form a memory qubit, L and R. The laser pulses are coupled into an optically thick atomic cloud 15.

All-atoms in the cloud 15 are prepared in state $|a\rangle$. A classical write laser pulse tuned to a $|a\rangle\rightarrow|c\rangle$ transition is split into two beams by a first polarizing beam splitter 12 (PBS1) and is passed through the atomic sample in the cloud 15. The pulse reflected by the beam splitter 12 is transmitted through a first portion of the cloud 15 defining a first channel. The pulse transmitted by the beam splitter 12 is passed through a half wave plate ($\lambda/2$) 13, reflected from a mirror 14 and transmitted through a second portion of the cloud 15 defining a second channel. The light induces spontaneous Raman scattering on a $|c\rangle\rightarrow|b\rangle$ transition. The classical write pulse is so weak that, on average, less than one photon is scattered in this manner into a forward direction mode for each pulse in either L or R. The forward scattered mode is dominantly correlated with a distinct collective atomic state. In the first order of perturbation theory in the atom-light coupling $\chi$ the atom-light state is given by $$|\Psi\rangle\sim|a\rangle_1 \ldots |a\rangle_{N_L+N_R}|0_p\rangle_L|0_p\rangle_R+\chi(|L_a\rangle|1_p\rangle_L|0_p\rangle_R+|R_a\rangle|0_p\rangle_L|1_p\rangle_R) \quad (1)$$

Two effective states of the atomic ensembles are defined as $$|L_a\rangle = \sum_{i=1}^{N_L} g_i\,|a\rangle_1 \ldots |b\rangle_1 \ldots |a\rangle_{N_L} \ldots |a\rangle_{N_L+N_R} \quad (2)$$

-continued $$|R_a\rangle = \sum_{j=N_L+1}^{N_L+N_R} g_j|a\rangle_1 \ldots |a\rangle_{N_L} \ldots |b\rangle_j \ldots |a\rangle_{N_L+N_R}$$

with weights $g_i$ and $g_j$ determined by the field intensity distribution of the write laser pulse, $$\sum_{i=1}^{N_L} |g_i|^2 = 1, \sum_{j=N_L+1}^{N_L+N_R} |g_j|^2 = 1.$$

$|L_a>$ and $|R_a>$ have properties of a two-level system (qubit): $<L_a|L_a>=1$, $<R_a|R_a>=1$, and $<L_a|R_a>=0$. Although the interaction of the light with the atoms in the cloud 15 is nonsymmetric with respect to permutation of atoms, the second term in Eq. 1 describes a strongly entangled atom-photon state.

Second and third polarizing beamsplitters 16, 17 (PBS2, PBS3) along with a second mirror and a second half wave plate (λ/2) 19 are used to couple laser light derived from the cloud 15 to a polarizing beam combiner 21 (PBS4). The polarizing beam combiner 21 (PBS4) is used to map the two spatial modes associated with the two ensembles into a single spatial mode with polarization encoding of the light's origin (i.e., the laser 11): $|1_p>_L \rightarrow |H'>_s; |1_p>_R \rightarrow |1_v>_s$, where H and V indicate horizontal and vertical polarization, respectively, and s denotes signal. The light (having the single spatial mode) is then passed through a dichroic mirror (DM) 22, a first arbitrary polarization state transformer 23 ($R_s$(θs, $\phi_s$)) which comprises quarter- and the half-wave plates, and a polarizer 24 (PBS5). The state of the light at the output of the polarizer 24 (PBS5) is $$|H'>=\cos(\theta_s)e^{i\phi_s}|H>_s+\sin(\theta_s)|V>_s \quad (3)$$

and is directed onto a first single-photon detector 25 (D1). When the first single-photon detector 24 (D1) detects a photon, the joint state in Eq. 1 is projected into the desired atomic state $$|\Psi_a>=\cos(\theta_s)e^{-i\phi_s}|L_a>+\sin(\theta_s)e^{i\eta_s}|R_a> \quad (4)$$

which is an entangled state of the two atomic samples L and R.

Phase $\eta_s$ is determined by the difference in length of the two paths L and R. After a variable delay time Δt, the atomic excitation is converted into a single photon by illuminating the atomic ensemble in the cloud 15 with a (read) pulse of light near resonant with a $1b> \rightarrow 1d>$ transition. For an optically thick atomic sample, a photon is emitted with high probability into a spatial mode determined by the write pulse, achieving memory read-out.

$$|\Psi_a>=\cos(\theta_s)e^{-i\phi_s}|L_a>+\sin(\theta_s)e^{i\eta_s}|R_a> \rightarrow |\Psi>_i=\cos(\theta_s) e^{-i\phi_s}|H>_i+\sin(\theta_s)e^{i(\eta_i+\eta_s)}|V>_i \quad (5)$$

That is, the polarization state of the idler photon (i) is uniquely determined by the observed state of the signal photon. Alternatively, the signal may be stored in a fiber until after the readout. In that case, the two-photon signal-idler state would be a maximally entangled state:

$$|\Psi_M\rangle = \frac{1}{\sqrt{2}}(|H\rangle_s|H\rangle_i + e^{i(\eta_i+\eta_s)}|V\rangle_s|V\rangle_i) \quad (6)$$

More specifically, as is shown in FIG. 2*a*, a magneto-optical trap (MOT) 15*a* comprising $^{85}$Rb (Rubidium) may be used to provide the optically thick atomic cloud 15. The ground states {|a); |b)} correspond to $5S_{1/2}$,F=(3,2) levels of $^{85}$Rb, while the excited states {|c>; |d>} represent the {$5P_{3/2}$,F=3;$5P_{1/2}$,F=2} levels of {$D_2$, $D_1$} lines at {780; 795} nm, respectively. All of the atoms in the cloud 15 are prepared in state |a> by optical pumping, after shutting off trapping and cooling light.

As is shown in FIG. 2*a*, a 140-ns-long write pulse tuned to the $|a> \rightarrow |c>$ transition is split into two beams by the first polarizing beam splitter 12 (PBS1) and is focused into two regions of the magneto-optical trap (MOT) 15*a* about 1 mm apart, with Gaussian waists of about 50 μm. The second and third polarizing beamsplitters 16, 17 (PBS2, PBS3) separate the horizontally polarized component of the forward scattered light from the vertically polarized classical pulse. After being mixed by the polarizing beam combiner 21 (comprising a fourth polarizing beamsplitter 21 (PBS4)), the light passes through the first arbitrary polarization state transformer 23 ($R_s(\theta_s,\phi_s)$). The light continues to the fifth polarizer 24 (PBS5), and is directed to the first single-photon detector 25 (D1). Detection of one photon by the first single-photon detector 25 (D1) prepares the atomic ensemble in any desired state in the basis of $|L_a>$, $|R_a>$, determined by $R_s$(θs, $\phi_s$), and thereby concludes preparation of the quantum memory qubit. The output of the first single-photon detector 25 (D1) is coupled to processing circuitry 30.

Following memory state preparation, read-out is performed. After a user-programmable delay, Δt, a 115-ns-long read pulse, for example, tuned to the $|b> \rightarrow |d)$ transition illuminates the two atomic ensembles in the atomic cloud 15. This accomplishes a transfer of the memory state onto the single photon (idler) emitted by the $|d> \rightarrow |a>$ transition. The light in the two channels is combined by the polarizing beam combiner 21, reflected from the dichroic mirror (DM) 22, passes through a second state transformer 26 ($R_i(\theta_i, \phi_i)$ and a sixth polarizing beamsplitter 27 (PBS6), and the two polarization components are directed onto second and third single-photon detectors 28, 29 (D2, D3). This accomplishes measurement of the idler photon, and hence the memory qubit, on a controllable arbitrary basis. The outputs of the second and third single-photon detectors 28, 29 (D2, D3) are coupled to the processing circuitry 30.

Various imperfections may prevent read-out of the quantum memory (idler photon) from being identical to the intended state written into the memory. To quantify the degree to which the quantum memory was faithfully prepared and read out, the polarization correlations between the signal and idler photons were measured.

The observed correlations allow characterization of the extent to which the procedures are working. To investigate the storage capabilities of the memory qubit quantitatively, time-resolved detection of the signal and idler photons for two values of delay Δt were used between the application of the write and read pulses, 100 ns and 200 ns. The electronic pulses from the detectors were gated, with 250-ns and 140-ns windows centered on the time determined by the write and read light pulses, respectively. The electronic pulses were fed into processing circuitry 30 comprising a time-interval analyzer (with $\delta$=2 ns time resolution). To measure the correlation between the photons produced by the write and read pulses, the output of the first single photon detector 25 (D1) was fed into a "start" input of the time-interval analyzer, and the outputs of the second and third single-photon detectors 28, 29 (D2, D3) were fed into two "stop" inputs of the time-interval analyzer. A coincidence window imposed by data acquisition software selects a time interval between the arrival of the idler and signal of (0, 80) ns for $\Delta$t=100 ns and (25,145) ns for $\Delta$t=200 ns.

The conditional probabilities of detecting a certain state of the idler were measured (hence, of the quantum memory state) in the basis of $|H>_i$ and $|V>_i$, given the observed state of the signal photon. Varying the angle $\theta_s$ produces the correlation patterns shown in FIG. 4*a* for $\Delta$t=100 ns. Table 1 shows conditional probabilities P(I|S) to detect the idler photon in state I given detection of the signal photon in state S, at the point of maximum correlation for $\Delta$t=100 ns delay between read and write pulses; all errors are based on counting statistics of coincidence events.

TABLE 1

| Basis | P(Hi\|Hs) | P(Vi\|Hs) | P(Vi\|Is,) | P(Hi\|Vs) |
|---|---|---|---|---|
| 0° | 0.92 ± 0.02 | 0.08 ± 0.02 | 0.88 ± 0.03 | 0.12 ± 0.03 |
| 45° | 0.75 ± 0.02 | 0.25 ± 0.02 | 0.81 ± 0.02 | 0.19 ± 0.02 |

Figure 4A:
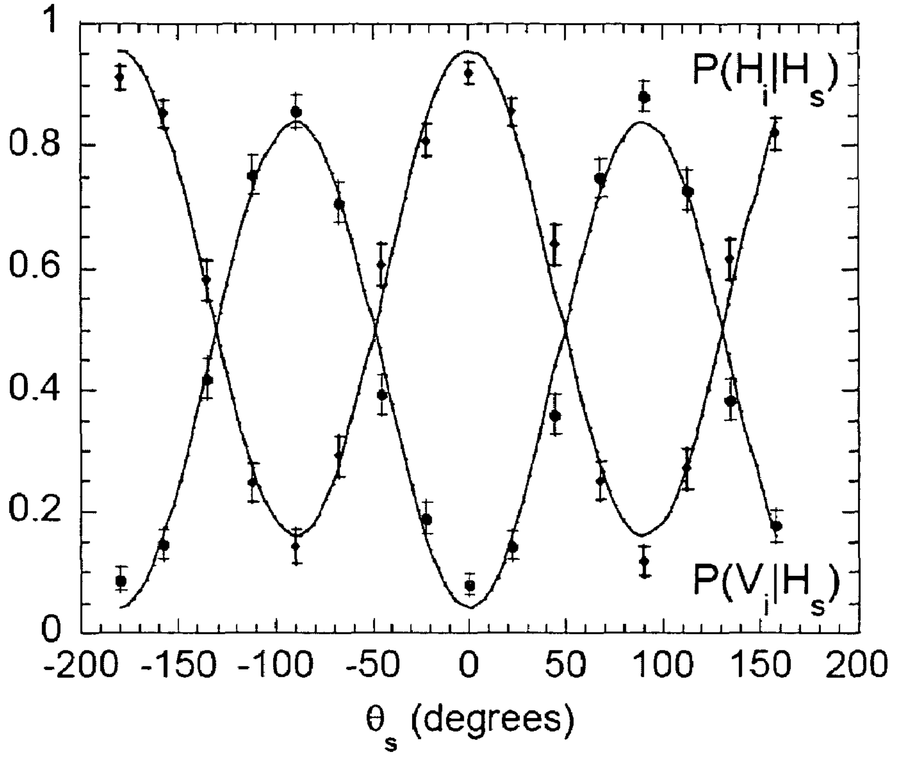
FIG. 4*a* illustrates measured conditional probabilities as a function of polarization rotation $\theta_s$ of the signal photon.
Figure 4B:
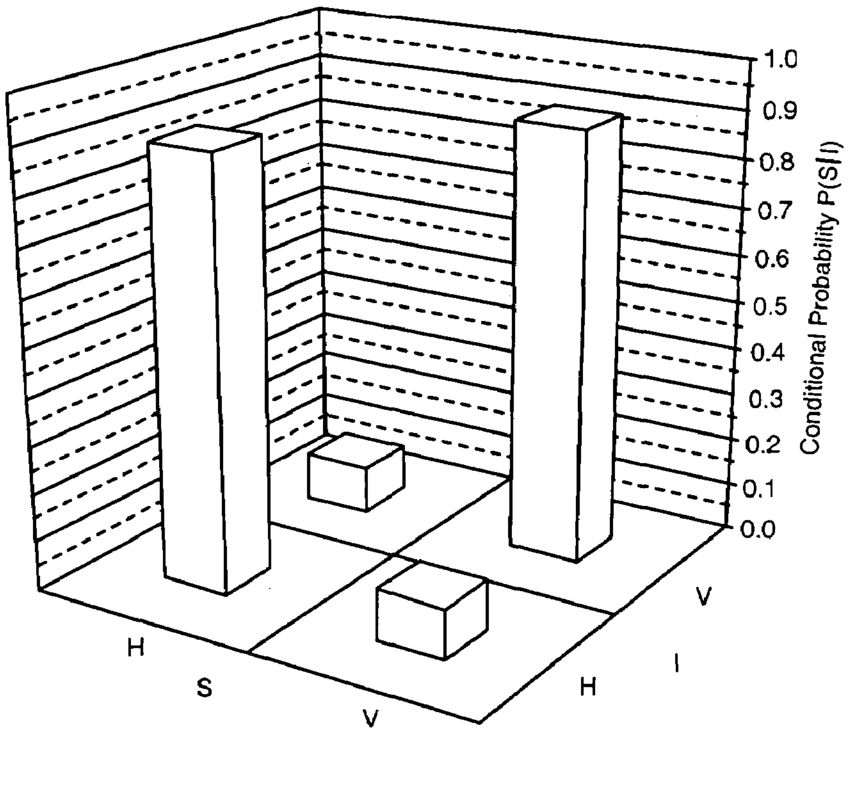
FIG. 4*b* illustrates measured conditional probabilities at points of highest correlation.
Figure 5A:
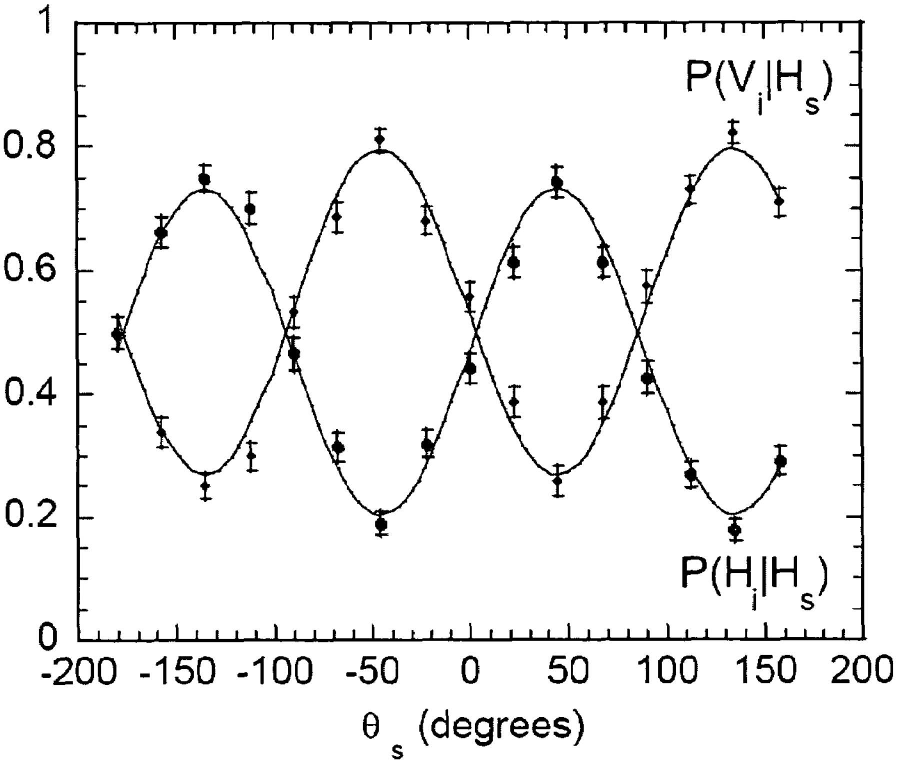
FIG. 5*a* illustrates measured conditional probabilities after $\theta_s=\pi/4$ polarization rotation of the idler photon as a function of $\theta_s$.
Figure 5B:
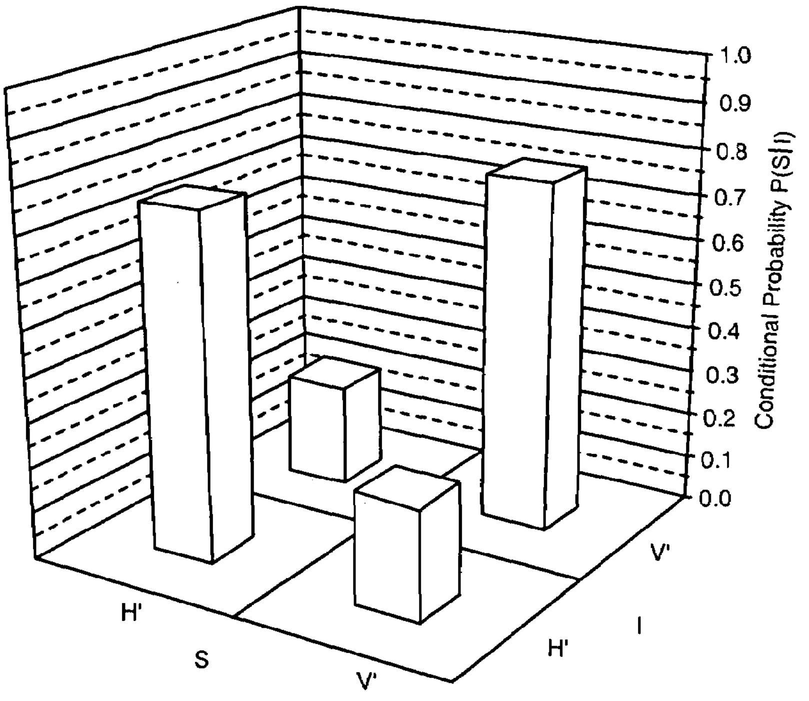

Conditional probabilities at the point of maximum correlation are shown in FIG. 4*b* and the first line of Table 1. To verify faithful memory preparation and readout, the correlation measurement was repeated in a different basis, that of states $|H>_i \pm |V>_i)/\sqrt{2}$, by choosing $\theta_i$=45°, $\phi_i$=0°, and $\theta_s$=−($\eta_s$+$\eta_i$) in the state transformers $R_s$ and $R_i$. $\theta_i$ is varied with the measured interference fringes displayed in FIG. 5*a*. Table 1 (second line) and FIG. 5*b* show the conditional probabilities at the point of maximum correlations. These probabilities are different from ½ only when the phase coherence between the two states of the atomic qubit is preserved in the matter-to-light quantum state mapping.

From these measured correlations, the fidelity of the reconstruction of the intended quantum memory state $|\Psi_i>$ in the idler, $|<\Psi_I|\Psi_i>|^2$ may be determined. The fidelity is given by the value of the corresponding conditional probability at the point of maximum correlation, presented in Table 1 (the lower of the two values was chosen as the lower bound). For states in the $\theta_i$=0° basis, it was found that $F_0$=0.88±0.03, clearly exceeding the classical boundary of ⅔. For the $\theta_i$=45° basis, it was found that $F_{45}$=0.75±0.02, again substantially violating the classical limit. These fidelities give a lower bound for the fidelities of both the memory preparation and the read-out steps, which were not measured separately.

Another way to quantify the performance of our quantum state transfer is to calculate the fidelity of entanglement between the signal and idler photons $F_{si}$. The lower bound on $F_{si}$ is given by the overlap of the measured density matrix, with the maximally entangled state that is desired to be achieve, $|\Psi_M>$, given by Eq. 6: $F_{si}=<\Psi_M|\rho_{si}|\Psi_M>$. $F_s$=0.67±0.02 was calculated, substantially greater than the classical limit of ½.

Figure 6:
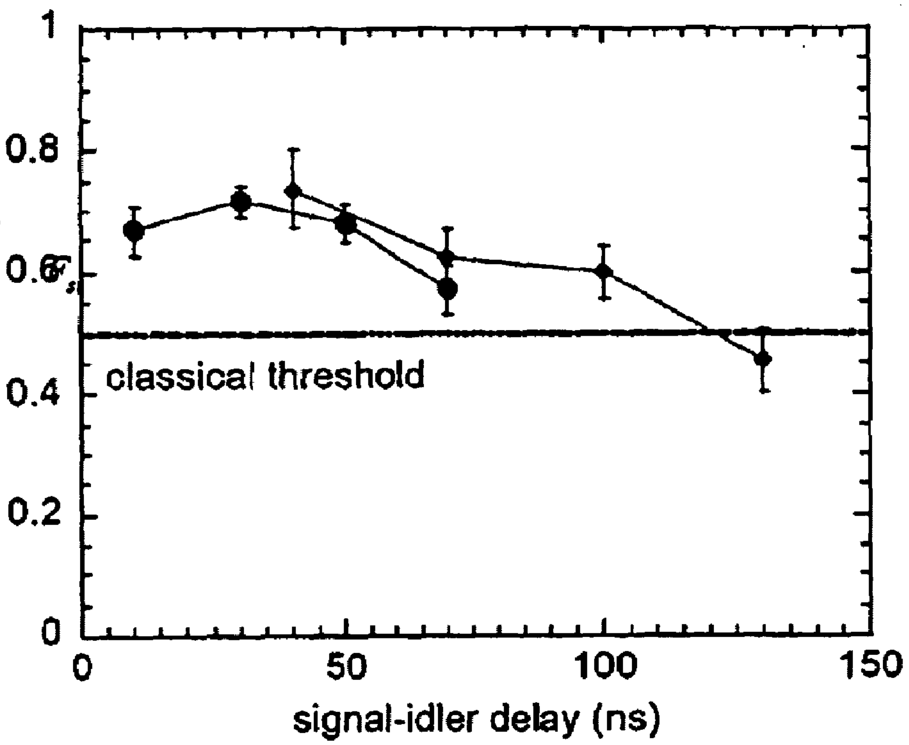
* and FIG. 6 is a graph that illustrates time-dependent entanglement fidelity of the signal and the idler $F_{SI}^2$.

At a longer delay of 200 ns, the fidelities in the $\theta_i$=0° and $\theta_i$=45° bases are $F_0$=0.79±0.04 and $F_{45}$=0.74±0.04, while fidelity of entanglement is $F_s$=0.63±0.03. For both values of $\Delta$t, the fidelity of entanglement was analyzes as a function of the delay between the detections of the signal and the idler. The full coincidence window was split into four equal intervals and entanglement of formation for each one was calculated (FIG. 6). From these results, it was conclude that the quantum memory has a useful operational time of about 150 ns. The lifetime of coherence between levels |a> and |b> determines the lifetime of the quantum memory and is limited by the magnetic field of the trapping quadrupole field of the magneto-optical trap (MOT) 15*a*.

Nonzero coincidence counts in the minima of FIG. 4*a* are due to transmission losses and nonideal spatial correlations between the signal and idler photons. The residual interferometric drifts in $\eta_s$ and $\eta_i$ further reduce the visibility of FIG. 5*a* compared with FIG. 4*a*, resulting in a degradation of the fidelities. Losses also reduce the rate of entanglement generation. The rate of signal photon detections (and hence, atomic qubit preparation) is given by $R_s=\alpha n_s R \cong 300\ s^{-1}$, where $\alpha$=0.05 is the measured transmission efficiency for the write beam (which includes 0.60 detection efficiency) and $R=4.7\times10^5\ s^{-1}$ is the repetition rate. Therefore, the inferred average photon number in the forward scattered mode per pulse is $1.4\times10^{-2}$. The coincident signal-idler detection rate is $R_{si}=\zeta R_s \zeta\alpha n_s R \cong 0.4\ s^{-1}$, where $\zeta=\beta\xi\cong1.1\times10^{-3}$. The measured transmission and detection efficiency for the read laser pulse is $\beta$=0.04, so it is inferred the efficiency of quantum state transfer from the atoms onto the photon, $\xi$=0.03.

Thus, a quantum node has been realized by combining the entanglement of atomic and photonic qubits with the atom-photon quantum state transfer. By implementing the second node at a different location and performing a joint detection of the signal photons from the two nodes, a quantum repeater protocol, as well as distant teleportation of an atomic qubit, may be realized. It is estimated that the rate for these protocols is $R_2\cong(\zeta\alpha n_s)^2 R \cong 3\times10^{-7} s^{-1}$. Improving $\xi$ by increasing the optical thickness of the atomic sample, and eliminating transmission losses, will provide several orders of magnitude increase in $R_2$. The disclosed apparatus and methods also allow realization of quantum nodes comprising multiple atomic qubits by using multiple beams of light. This approach provides the ability to implement distributed quantum computation.

Thus, apparatus and methods that provide for quantum state transfer of information between matter and light have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Apparatus, comprising:

apparatus for confining an optically thick atomic cloud that supports a plurality of distinct quantum state transitions and which is configured in a first atomic state;

laser apparatus for outputting a write pulse tuned to a transition between the first quantum state and a second quantum state of the atomic cloud, and for outputting a read pulse tuned to a transition between a third quantum state and a fourth quantum state of the atomic cloud;

optical apparatus for separately coupling the write and read pulse into two regions of the atomic cloud, wherein, in response to the write pulse, a first photon having a distinct spatial mode is scattered on a transition between the second quantum state and the third quantum state, and wherein, in response to the read pulse, a second photon having a distinct spatial mode is scattered on a transition between the fourth quantum state and the first quantum state;

a beam combiner for respectively mapping the distinct spatial modes associated with the first and second photons into first and second polarization encoded photons, respectively, having a single spatial mode with polarization encoding of the laser apparatus; and apparatus for altering the polarization of the first and second polarization encoded photons to respectively alter the quantum state of the atomic cloud and inscribe a quantum bit of information upon the cloud, and read out the quantum bit of information from the cloud.

2. The apparatus recited in claim 1 wherein the apparatus for altering the polarization of the first and second polarization encoded photons comprises a plurality of single-photon detectors.

3. Apparatus comprising:

apparatus for confining first and second optically thick atomic clouds;

laser apparatus for transmitting a first laser light pulse through the first and second atomic clouds, causing emission of a first photon that is quantum-mechanically entangled with both clouds;

apparatus for altering the polarization of the first photon to alter the quantum state of the atomic clouds and inscribe a quantum bit of information upon the clouds;

laser apparatus for transmitting a second laser light pulse through the first and second atomic clouds causing emission of a second photon whose polarization contains the inscribed quantum bit of information; and apparatus for altering the polarization of the second photon to alter the quantum state of the atomic clouds and read out the quantum bit of information from the clouds.

4. The apparatus recited in claim 3 wherein the apparatus for altering the polarization of the photons comprise single photon detectors.

5. A method of transferring quantum information from matter into light, comprising:

transmitting a first laser light pulse substantially simultaneously through first and second optically thick atomic clouds, causing emission of a first photon that is quantum-mechanically entangled with both clouds;

altering the polarization of the photon to alter the quantum state of the atomic clouds and inscribe a quantum bit of information upon the clouds;

transmitting a second laser light pulse substantially simultaneously through the first and second atomic clouds to induce the clouds to emit a second photon whose polarization contains the inscribed quantum bit of information and thereby transfer quantum information from matter into light.

* * * * *